Patented Feb. 15, 1938

2,108,214

UNITED STATES PATENT OFFICE 2,108,214

POLISHING COMPOSITION

Leroy W. Shuger, Baltimore, Md., assignor to Baltimore Paint and Color Works, Inc., Baltimore, Md., a corporation of Maryland No Drawing. Application March 12, 1936, Serial No. 68,542

5 Claims. (Cl. 134—24)

This invention relates to a polishing composition for use in cleaning and restoring the luster of varnished, enamelled, lacquered and bakelite surfaces. The composition is particularly adapted for polishing automobiles, furniture, floors and the like.

Various oils such as vegetable oil have been suggested for use in emulsion polishes. The instant invention, however, has as one of its objects the use of fish oils as a luter restorer and as a film which protects the treated surface against weathering.

Fish or marine oils, although available for many years, were not found desirable as an ingredient in polishing compositions. This was due to the fact that they possessed a high acid number and the tendency to rancidity, resulting in instability of the emulsion of which they formed a part. Furtherfore, the oils had a "fish odor" which persisted in the residual film after application of the polish to a surface being treated. This was very objectionable and prevented their use. In general, the fish or marine oils available were crude and not standardized. Their physical characteristics varied from one shipment to another, and all of these factors made them unreliable as a polish ingredient.

In the last few years, it has been found that the properties of the fish oils could be improved and standardized, and their characteristic odor completely removed by refining with alkalis, by treatment with heat, and by blowing with air. As a result of these illustrative refining methods, there is available today fish oils of low acid number, pale in color, which are free from all "fishy" or unpleasant odors. These oils have greater heat resisting qualities, toughness, elasticity, durability and resistance to exposure, these superiorities enhancing their value as an ingredient of polishes. A fish oil film will outwear a linseed oil film. In addition, fish oils are outstanding in their ability to resist salt air ravages, which property adds to their usefulness as a polish ingredient in polishing compositions to be used in seaboard regions. Finally, fish oils are cheaper than linseed or other vegetable oils.

Fish oils may be divided into two main classes, namely:

Menhaden (Atlantic)
Sardine (Pacific)

When received, raw fish oil contains ten to thirty per cent stearine which is a solid fat, and which is removed by filtering or pressing at a low temperature. The elimination of the stearine removes that ingredient which tended to produce a greasy film when an unrefined fish oil was used in a polishing composition. The quality of fish oils is determined by the degree to which the stearine has been removed. The lack of stearine is determined by the low temperature to which the oil may be subjected without showing haze. The types of refined fish oil may be classified as follows:

1. Light pressed fish oil—cold test 32° F. Maximum acid number—6. Iodine number 180–185. Light in color.

2. Alkali refined fish oil—prepared from light pressed fish oil. Maximum acid number—0.5. Pale straw color.

3. Heat-treated fish oil—when fish oil from which stearine has been removed or when alkali refined fish oil is put in a kettle and heated to 550° F. or higher, it will bleach, become heavy bodied, and completely deodorized.

4. Light and heavy blown fish oils—prepared by blowing air through fish oil at a given temperature, the characteristic of the blown fish oil being determined by the extent of blowing. Blown fish oils have acid numbers from 10–12, saponification values above 190, iodine values 100–130, specific gravities, .989–.995.

Set out below is a preferred formula for a polishing composition employing a refined fish oil, the various ingredients being specified in approximate proportions by weight:

| | Parts |
|---|---|
| Mineral spirits | 130 |
| Light mineral oil | 125 |
| Toluol | 5.8 |
| Oleic acid | 9 |
| Heat-treated fish oil | 58.4 |
| Potassium hydroxide | 1.55 |
| Water | 387 |

The heat-treated fish oil of the formula preceding may have an acid number of 5; iodine value of 105; Saybolt viscosity at 210° F. of 425 and is free of all "fishy" and objectionable odor.

The following procedure in the manufacture of the above composition has been found advantageous.

The potassium hydroxide is dissolved in the water. The oleic acid is then added with stirring. With the stirring continued, refined fish oil is added followed by the mineral oil, mineral spirits and toluol.

While in the preferred formula, a heat-treated fish oil having specific properties has been employed, it will be understood that any of the various refined fish oils mentioned will be found equally useful.

The fish oil acts as a luster restorer to the finish to which it is applied and gives durability thereto. The mineral oil acts as a lubricator during the polishing operation and also has a cleansing action. The toluol and mineral spirits also aid in this cleansing action and in addition each acts as a diluent for the mineral oil. The oleic acid and potassium hydroxide react to form a potassium oleate soap which serves as an emulsifier, the fish oil and the mineral oil being emulsified in the water, the latter being the continuous phase. Obviously, other soaps may be satisfactorily used other than potassium oleate soap. Also in lieu of toluol, other aromatic hydrocarbons may be employed. Finally, in lieu of mineral spirits other petroleum fractions will be found useful.

While the various ingredients and the method of combining them to produce an emulsion polish have been set out in great detail, it is evident that these may be altered in many respects without departing from the spirit of the invention and it is my intention to cover all such and to be limited in this respect only as may be necesary by the scope of the claims hereto appended.

Having thus described the invention, what I claim is:

1. A polishing composition composed of the following ingredients in substantially the following proportions by weight:

| | Parts |
|---|---|
| Mineral spirits | 130 |
| Toluol | 5.8 |
| Light mineral oil | 125 |
| Oleic acid | 9 |
| Potassium hydroxide | 1.55 |
| Odorless, stearine-free heat-treated fish oil | 58.4 |
| Water | 387 |

2. An emulsion polishing composition highly resistant to weather ravages comprising as a luster restorer, an odorless, stearine-free fish oil, as a lubricator and cleanser, mineral oil, and water, and in which the water is the continuous phase.

3. An emulsion polishing composition highly resistant to weather ravages comprising as a luster restorer, an odorless, stearine-free, alkali refined fish oil, as a lubricator, and cleanser, mineral oil, and water, and in which the water is the continuous phase.

4. An emulsion polishing composition highly resistant to weather ravages comprising as a luster restorer, an odorless, stearine-free, air blown fish oil, as a lubricator and cleanser, mineral oil, and water, and in which the water is the continuous phase.

5. An emulsion polishing composition highly resistant to weather ravages comprising as a luster restorer, an odorless, stearine-free, alkali refined fish oil, as a lubricator and cleanser, mineral oil, a mineral oil diluent and water, and in which the water is the continuous phase.

LEROY W. SHUGER.